United States Patent
Lebégue et al.

(10) Patent No.: US 6,175,895 B1
(45) Date of Patent: Jan. 16, 2001

(54) CACHE ENABLING ARCHITECTURE

(75) Inventors: Xavier Lebégue, Paris (FR); Rainer Schweer, Niedereschach (DE)

(73) Assignee: Deutsche Thomson-Brandt GmbH, Villingen-Schwenningen (DE)

(*) Notice: Under 35 U.S.C. 154(b), the term of this patent shall be extended for 0 days.

(21) Appl. No.: 09/135,989

(22) Filed: Aug. 18, 1998

Related U.S. Application Data

(60) Provisional application No. 60/058,452, filed on Sep. 8, 1997.

(30) Foreign Application Priority Data

Sep. 8, 1997 (EP) ................................................ 97115527

(51) Int. Cl.⁷ ...................................................... G06F 12/08
(52) U.S. Cl. ................................................................ 711/113
(58) Field of Search ............................................. 711/113

(56) References Cited

U.S. PATENT DOCUMENTS

| | | | |
|---|---|---|---|
| 5,218,685 | * 6/1993 | Jones | 711/160 |
| 5,806,085 | * 9/1998 | Berliner | 711/113 |
| 5,884,093 | * 3/1999 | Berenguel et al. | 710/1 |

FOREIGN PATENT DOCUMENTS

| | | |
|---|---|---|
| 44 22 786 | 1/1995 | (DE) . |
| 0273665 A2 | 7/1988 | (EP) . |
| 0475639 A2 | 3/1992 | (EP) . |

OTHER PUBLICATIONS

Berinato, Scott. "New Hard–Disk Specs from WD", PC Week, Dec. 2, 1996 [online], [retrieved Sep. 7, 2000]. Retrieved from www5.zdnet.com/zdnn/content/pcwk/1348/pcwk0119.html.*

M. Yoshida et al., "High Performance Cache Disk Subsystem", Jun. 1994, pp. 129–134, Hitachi Review, Tokyo Japan.

Western Digital Corp., Western Digital Develops SDX Technology For Hard Drives That Improve Price/Performance of Removable Media Storage Peripherals, Sep. 4, 1997 pp. 1–5.

Western Digital Corp., "SDX (Storage Data Acceleration)", Technology for Enhanced Peripheral Performance, 1997.

G. Hoffman et al., "IEEE 1394: A Ubiquitous Bus", presented at COMPCON '95, Mar. 1995, San Francisco, CA.

* cited by examiner

*Primary Examiner*—Reginald G. Bragdon
(74) *Attorney, Agent, or Firm*—Joseph S. Tripoli; Ronald H. Kurdyla; Alexander J. Burke

(57) ABSTRACT

A cache enabling architecture in which an optical storage reading and/or writing device, a caching processor and a mass writing and reading device are each connected to a data bus. The optical storage reading and/or writing device exchanges information directly with the caching processor over the data bus. The caching uses the mass writing and reading device as cache memory.

5 Claims, 1 Drawing Sheet

CACHE ENABLING ARCHITECTURE

This application claims benefit to U.S. provisional 60/058,452 filed Sep. 8, 1997.

BACKGROUND OF THE INVENTION

1. Field of the Invention

The present invention relates to a cache enabling architecture in which information at an output and/or input of a storage reading and/or writing device may be cached. The cache enabling architecture may for example be implemented in a computer system to which the storage reading and/or writing device is connected. Typically the connection is done via a data bus.

2. Background of the Invention

Caching information from storage devices is a known technology. More specially and as examples many solutions are known to cache Random Access Memory, hard disk drive devices and other mass storage devices. These memory devices are of common use in or in combination with computers. The requirements to cache a memory device are basically to provide a faster memory in which information may be accessed more efficiently than in the memory device, and to copy determined information from the memory device to the faster memory or vice versa. The determined information may for example be information which is most likely to be needed or most frequently needed. The copying and an identification of the determined information among information contained in the memory device (or in the faster memory) is performed by a cache processor. The cache processor may for example be a software program which runs on a computer. Caching thus improves the overall performance of information processing systems such as a microprocessor processing information stored in a RAM, or a computer processing information stored on a mass storage device peripheral.

Computers typically are used with peripherals such as magnetic and/or optical storage devices. These storage devices are connected directly or indirectly to a data bus. A microprocessor conducts information exchanges over the data bus between devices connected to this data bus. The performance in terms of access times to information stored on the storage devices varies depending on the nature of the storage devices. For example a performance of a magnetic hard disk drive device may be substantially greater than a performance of an optical disk device. It is known to cache an optical disk device using a magnetic disk drive device as faster memory.

In one implementation of caching a cache processor performs the caching using a direct link between the optical disk device and the hard disk drive device over which information is exchanged. The direct link is required because there is no other way to exchange information between the optical disk device and the magnetic hard disk device without involving the microprocessor and thus substantially slowing down the computer. On the other hand the direct link is a piece of hardware which does not belong to a standard computer equipment and which thus may add to the costs of producing a computer equipped with storage device peripherals.

Recent computer hardware comprises a data bus over which two peripherals may exchange data without significantly interfering with other peripheral connected to the data bus. This means that the microprocessor, which is also known as central processing unit, may perform other tasks than conducting information exchange between the two peripherals. For example, the microprocessor may process data stored in a RAM. The data bus may for example be based on a IEEE 1394 bus.

SUMMARY OF THE INVENTION

It is an object of the present invention to find a solution in which an optical storage device peripheral may be cached using another storage device peripheral but eliminating the need for an own direct link between the two peripherals. The solution should as much as possible make use of an existing computer hardware.

According to the present invention a solution to the above mentioned problem is found in a cache enabling architecture for caching information at an output and/or input of an optical storage reading and/or writing device, comprising at least a mass writing and reading device, based on a magnetical hard disk drive, a data bus to which the mass writing and reading device is indirectly or directly connected and through which instructions sent from further devices other than the optical storage device, reach the mass writing and reading device, and a caching processor to cache the information using the mass writing and reading device. The caching processor is directly connected to the mass writing and reading device. The output and/or input of the optical storage reading and/or writing device and the caching processor are connected through the data bus, so as to directly exchange the information between the output and/or input and the caching processor.

According to the present invention another solution to the above mentioned problem is found in a magnetic hard disk drive device for use in a computer system. The computer system comprises at least a central processing unit, an optical storage reading and/or writing device and a data bus, the central processing unit and the optical storage reading and/or writing device being indirectly or directly connected to the data bus. The magnetic hard disk drive device further comprises a connection circuitry for connecting the magnetic hard disk drive device to the data bus, and a caching processor which receives from the databus requests for reading and/or writing information intended for the optical storage reading and/or writing device and conducts information exchange between the magnetic hard disk drive device and the optical storage reading and/or writing device over the data bus such as to cache the optical storage reading and/or writing device.

BRIEF DESCRIPTION OF THE DRAWINGS

Other objects and aspects of the invention will become apparent from the following description of embodiments with reference to the accompanying drawing, FIG. 1, which contains a schematic representation of a cache enabling architecture.

DETAILED DESCRIPTION OF THE PREFERRED EMBODIMENTS

Figure 1:
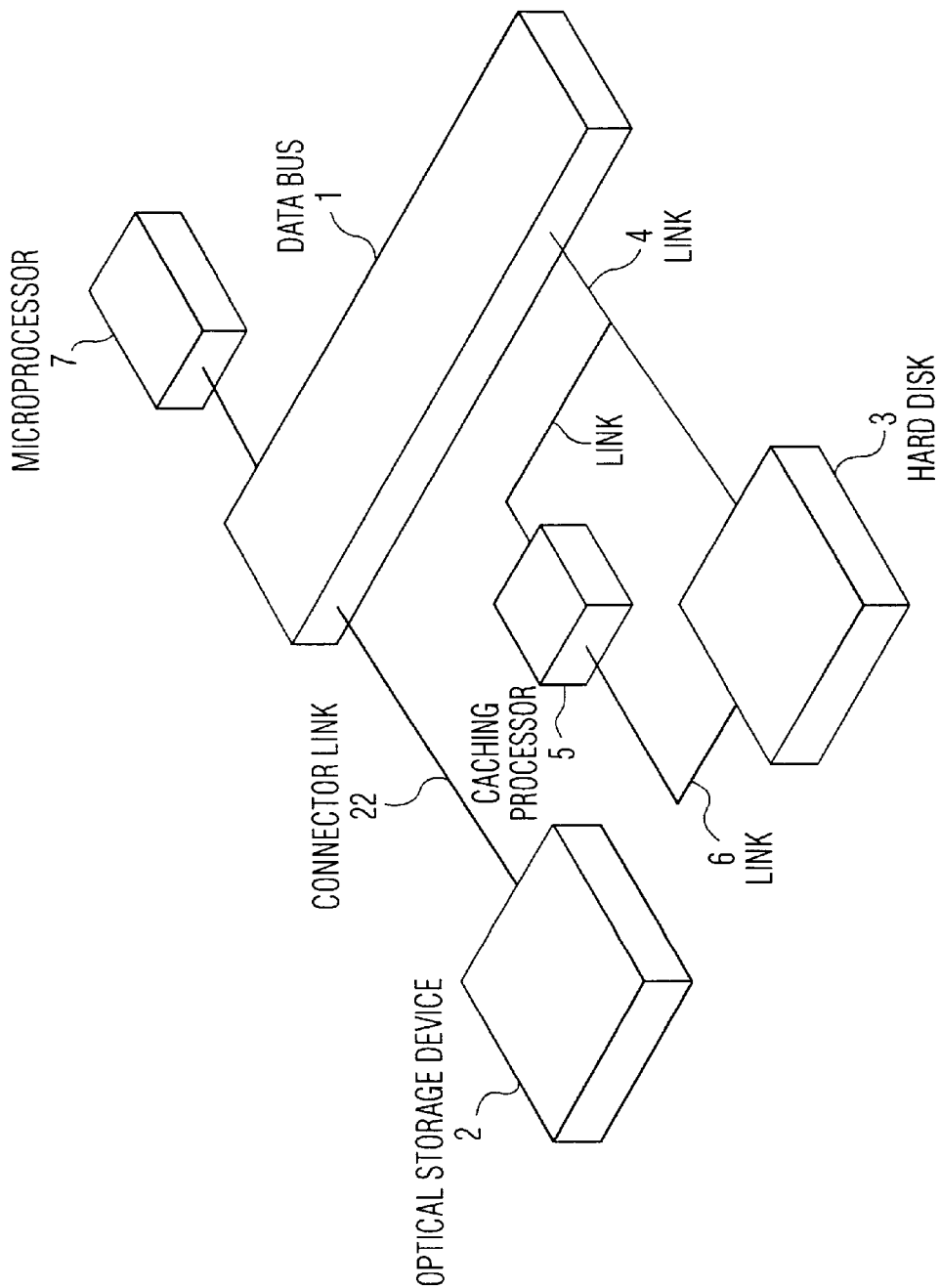

The described embodiments are not limitative and other embodiments may be considered by a person skilled in the art which remain in the scope of the present invention.

FIG. 1 shows a data bus 1 which may be part of a computer (not shown). The data bus 1 may for example be an IEEE 1394 based bus. The IEEE 1394 bus is a high-speed serial bus which allows to transport digital data. Furthermore the IEEE 1394 bus allows for direct communication and data exchange between devices connected to it.

An optical storage reading and/or writing device 2 is connected to the data bus 1 through an output and/or input connector link 22. The optical storage reading and/or writing device 2 may for example be a CD-ROM, DVD-ROM/RAM or CD-RW drive i.e., data is read/written optically or magneto-optically. Optical disk drive devices offers a relatively cheap way to access/store large quantities of information.

A mass writing and reading device 3 is connected to the data bus 1 through a link 4. The mass writing and reading device 3 may for example be a magnetic hard disk drive. The magnetic hard disk drive offers an advantageous price/performance ratio and is used in most computers.

A caching processor 5 is linked to the mass writing and reading device 3 through a link 6 and to the data bus 1 through the link 4.

The performance of the mass writing device 3 in terms of access time to information and transfer rate is typically greater than the performance of the optical storage reading and/or writing device 2. The caching processor 5 conducts exchanges of information between the optical storage reading and/or writing device 2 directly through the data bus 1. The caching processor 5 may for example send a request for information to the optical storage reading and/or writing device 2 upon which the latter transmits the requested information to the caching processor 5. The caching processor 5 sends the received requested information to the mass writing and reading device 3 which stores it.

Hence no direct dedicated link is required between the optical storage reading and/or writing and the mass writing and reading device. The cache enabling architecture uses the possibility for two devices to exchange information between each other through the data bus.

Typically a further device 7 is connected to the data bus 1. The further device 7 may for example be a microprocessor. The further device 7 sends requests for information to either the mass writing and reading device 3 or to the caching processor 5 which stands for the optical storage reading and/or writing device 2. The caching processor 5 processes these requests for information, gets the requested information from the mass writing and reading device 3 if the requested information is stored there or from the storage reading and/or writing device 2 if it is not and finally transmits it to the further device 7.

The caching processor 5 may also analyze the requests for information over a period of time and according to caching strategies. Caching strategies are well known to one skilled in the art. As a result of the analysis the caching processor 5 may determine which determined information is requested more frequently by the further device 7 than other information. The caching processor 5 may keep the determined information stored on the mass writing and reading device as long as it is frequently requested. The caching processor 5 may also implement a caching strategy known as read ahead, therewith anticipating requests for information of the further device 7.

In a further embodiment the caching processor 5 may also be used to receive information sent by the further device 7 on the data bus 1 and intended to be stored in the optical storage reading and/or writing device 2. The caching processor 5 will first send the received information to the mass writing and reading device 3 which stores it before copying this information from the mass writing and reading device 3 to the optical storage reading and/or writing device 2. A writing performance of the latter is thereby virtually increased by taking advantage of a writing performance of the mass writing and reading device 3.

Devices connected to the data bus 1 exchange information using communication protocols. In a preferred embodiment a communication protocol used between the storage reading and/or writing device 2 and the cache processor 5 may be an optimized version of a communication protocol used between the further device 7 and the caching processor 5 in order to enhance simplicity and performance.

Typically the mass writing and reading device 3 may comprise a dedicated caching processor of its own which caches the mass writing and reading device 3 itself. In a preferred embodiment a functionality of the caching processor 5 may include functions of the dedicated caching processor thereby eliminating the need for a physically distinct dedicated caching processor and further reducing costs.

What is claimed is:

1. Cache enabling architecture for caching information at an output and/or input of an optical storage reading and/or writing device, comprising at least a mass writing and reading device based on a magnetic hard disk drive, a data bus to which said mass writing and reading device and a caching processor are connected in parallel and through which also instructions sent from further devices other than said optical storage reading and/or writing device, reach the mass writing and reading device, a caching processor to cache said information using said mass writing and reading device, said caching processor being directly connected to said mass writing and reading device, said output and/or input of said optical storage reading and/or writing device and said caching processor being connected through said data bus, so as to directly exchange said information between said output and/or input and said caching processor.

2. Cache enabling architecture according to claim 1, wherein the caching processor is an integral part of said mass writing and reading device.

3. Cache enabling architecture according to claim 2, wherein the data bus is based on an IEEE 1394 bus.

4. Cache enabling architecture according to claim 1, wherein the data bus is based on an IEEE 1394 bus.

5. Magnetic hard disk drive device for use in a computer system comprising at least a central processing unit, an optical storage reading and/or writing device and a data bus, the central processing unit and the optical storage reading and/or writing device being indirectly or directly connected to the data bus, the magnetic hard disk drive device further comprising a caching processor which receives from the data bus requests for reading and/or writing information intended for the optical storage reading and/or writing devices and conducts information exchange between said magnetic hard disk drive device and said optical storage reading and/or writing device over said data bus such as to cache the optical storage reading and/or writing device and a connection circuitry for connecting the magnetic hard disk drive in parallel to said caching processor to the data bus.

* * * * *